United States Patent Office.

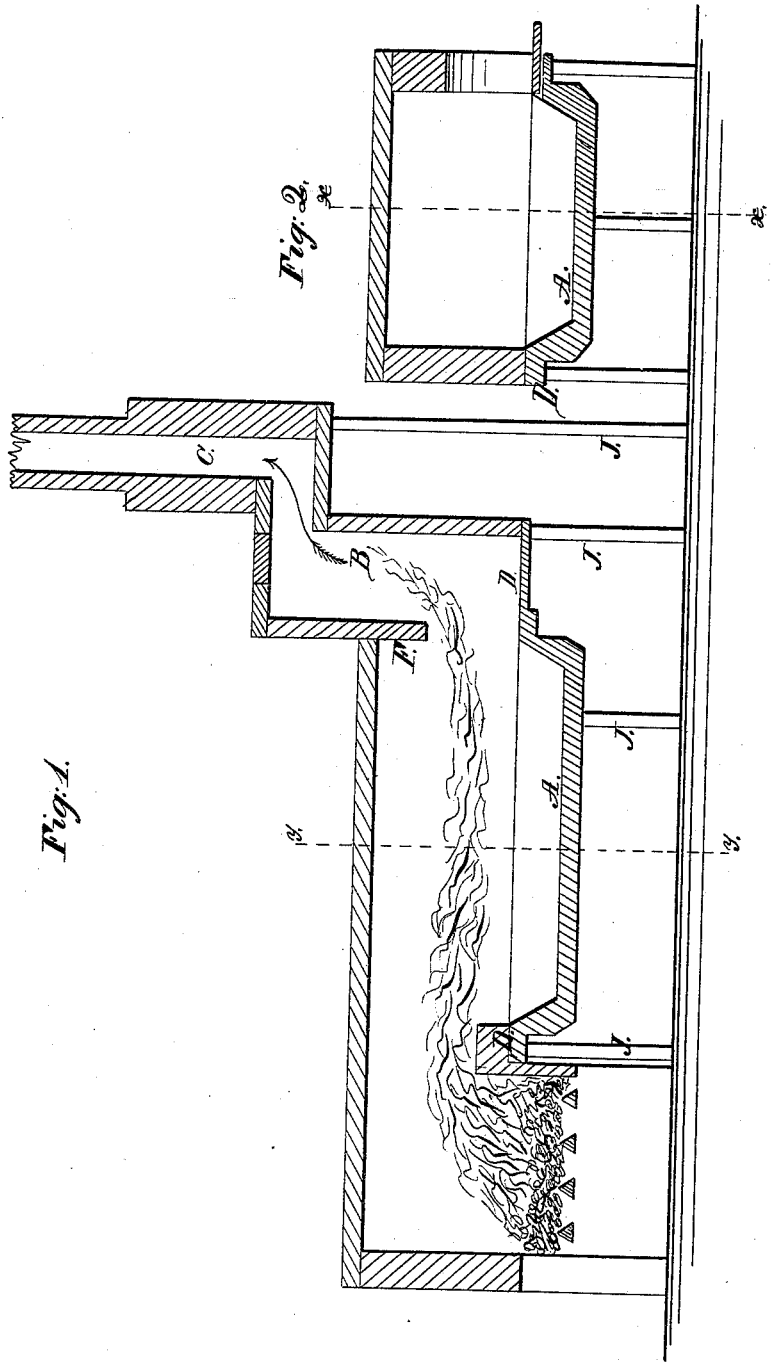

J. B. ROBINSON, OF DUNCANSVILLE, PENNSYLVANIA.

Letters Patent No. 94,342, dated August 31, 1869.

IMPROVEMENT IN PUDDLING FURNACES.

The Schedule referred to in these Letters Patent and making part of the same.

To all whom it may concern:

Be it known that I, J. B. ROBINSON, of Duncansville, in the county of Blair, and State of Pennsylvania, have invented a new and useful Improvement in Puddling-Furnaces; and I do hereby declare that the following is a full, clear, and exact description thereof, which will enable others skilled in the art to make and use the same, reference being had to the accompanying drawings, forming part of this specification.

This invention relates to new and important improvements in puddling or boiling-furnaces, whereby they are rendered much more durable, and more easily managed than such furnaces have hitherto been; and It consists in dropping down the bottom of the furnace, or forming it dishing, and supporting it from a projecting flange, so that the portion most exposed to the heat, and most liable to fail, is protected by its exposure to the air, thus obviating the necessity of providing it with "boxes" or chills for water, steam, or air for protecting it.

The invention consists, secondly, in the arrangement of the flue, from the furnace to the stock, as hereinafter more fully described.

In the accompanying plate of drawings—

Figure 1 represents a longitudinal vertical section of the furnace through the line x x.

Figure 2 is a vertical cross-section of fig. 1, through the line y y.

Similar letters of reference indicate corresponding parts.

A represents the bottom or hearth of the puddling-furnace;

B is the flue, and

C represents the stack.

As these bottoms have heretofore been made, they present a flat, even surface, and require to be protected by water-boxes or chills, which chills frequently become clogged or filled up, and have to be removed at considerable expense and trouble.

By making the bottom as represented in the drawing, and supporting it mainly from the projecting rim or flange D, the bottom is exposed to the air, and sufficiently protected thereby from the heat.

This bottom may be cast in one or more pieces, as may be considered most convenient or advisable.

In the ordinary puddling-furnace the current of heated gases is driven horizontally from the furnace into the stack. I have discovered that the heat is far more effective, and that it can be governed much more perfectly by allowing it to ascend in a flue before it enters the stack; I therefore pass the current under the hanging bridge-wall F, into the flue B, from whence it enters the stack C, indicated by the arrow.

Any form of valve or damper may be employed in the flue to regulate and control the current through the flue to the stack.

The "bottom," A, as well as the stack, may be supported on pillars, marked J, as seen in the drawing.

By making the bottom, as shown and described, and arranging the flue, as represented in the drawing, many of the difficulties experienced in the manufacture of iron are avoided.

Having thus described my invention,

I claim as new, and desire to secure by Letters Patent—

1. In combination with a puddling or boiling-furnace, the bottom A, constructed and arranged substantially as shown and described.

2. In combination with a puddling or boiling-furnace, the flue B and bridge-wall F, arranged substantially as described.

J. B. ROBINSON.

Witnesses:
O. M. IRVINE,
SAMUEL WALLACE.